United States Patent
Hayes et al.

(10) Patent No.: US 9,369,036 B2
(45) Date of Patent: Jun. 14, 2016

(54) POWER BOOTSTRAPPING FOR LOWERING QUIESCENT CURRENT

(71) Applicant: Broadcom Corporation, Irvine, CA (US)

(72) Inventors: Eric Martin Hayes, Fort Collins, CO (US); Mark David Rutherford, Wellington, CO (US)

(*) Notice: Subject to any disclaimer, the term of this patent is extended or adjusted under 35 U.S.C. 154(b) by 316 days.

(21) Appl. No.: 13/974,352

(22) Filed: Aug. 23, 2013

(65) Prior Publication Data

US 2015/0054340 A1 Feb. 26, 2015

(51) Int. Cl.
*G06F 1/00* (2006.01)
*H02M 1/36* (2007.01)
*H02M 3/156* (2006.01)
*H02M 1/00* (2006.01)

(52) U.S. Cl.
CPC .............. *H02M 1/36* (2013.01); *H02M 3/156* (2013.01); *H02M 2001/0006* (2013.01); *H02M 2001/0032* (2013.01); *H02M 2001/0045* (2013.01); *Y02B 70/16* (2013.01); *Y10T 307/406* (2015.04)

(58) Field of Classification Search
None
See application file for complete search history.

(56) References Cited

U.S. PATENT DOCUMENTS

| 7,260,732 | B1* | 8/2007 | Bittner, Jr. | 713/324 |
| 2008/0054873 | A1* | 3/2008 | Inoue | 323/351 |
| 2008/0290732 | A1* | 11/2008 | Hou | 307/64 |
| 2013/0166925 | A1* | 6/2013 | Sip | 713/300 |

OTHER PUBLICATIONS

SM74611 Smart Bypass Diode, Texas Instruments Incorporated, Dallas, Texas, Dec. 2012, 11 pages.

* cited by examiner

*Primary Examiner* — Kim Huynh
*Assistant Examiner* — Paul J Yen
(74) *Attorney, Agent, or Firm* — Brinks Gilson & Lione

(57) ABSTRACT

A circuit includes a switching regulator that produces a first voltage supply output and that includes an operational supply input. The operational supply input may provide power for running the logic in the switching regulator. The circuit also includes a linear regulator that produces a second voltage supply output. A control circuit accepts the first voltage supply output and the second voltage supply output and includes a power output connected to the operational supply input. The control circuit is configured to pass the second voltage supply output to the power output until the first voltage supply output is established. After the first voltage supply is established, the control circuit instead passes the first voltage supply output to the power output through the control circuit. The first voltage supply output may also then provide power to the circuitry that would otherwise have been powered by the linear regulator.

20 Claims, 6 Drawing Sheets

POWER BOOTSTRAPPING FOR LOWERING QUIESCENT CURRENT

TECHNICAL FIELD

This disclosure relates to voltage converters including linear regulators and switching regulators. This disclosure also relates to power saving techniques in circuit designs that include linear regulators and switching regulators.

BACKGROUND

Rapid advances in electronics and communication technologies, driven by immense customer demand, have resulted in the widespread adoption of mobile electronic devices. Just one example is a smartphone. The extent of the proliferation of such devices is readily apparent in view of the fact that many people own multiple cell phones that fill various roles, such as work communications and personal communications. In most mobile electronic devices, battery power is limited, and increased battery life is an important goal.

DETAILED DESCRIPTION

Figure 1:
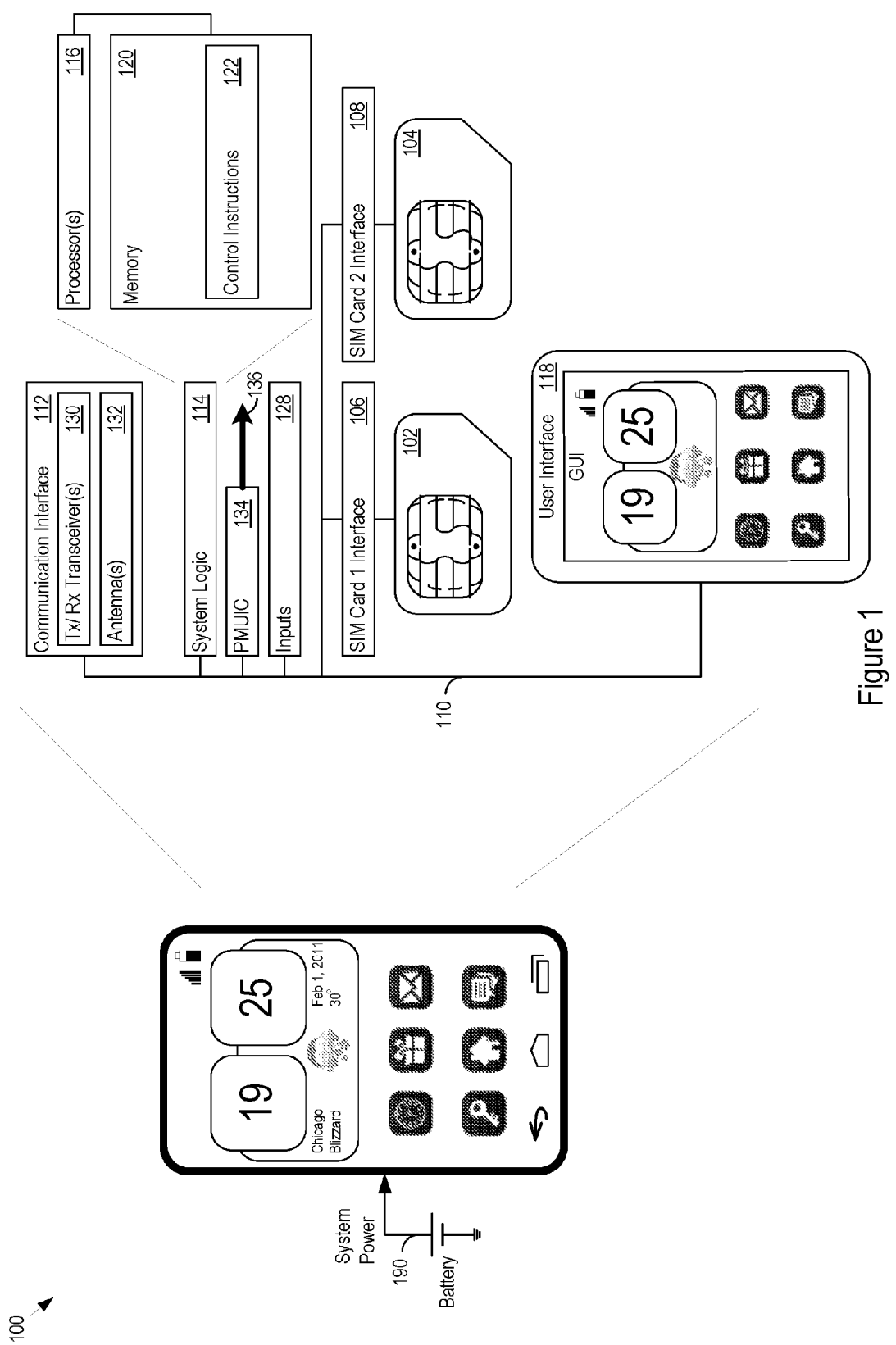
FIG. 1 shows an example of a mobile electronic device.

FIG. 1 shows an example of a mobile electronic device 100 ("device 100"). The device 100 is a smartphone in this example, but the device may be any electronic device, and may run from an energy limited power source such as the battery 190. The techniques described below are applicable for power saving in virtually any electronic device. Accordingly, the smartphone example described below provides just one example context for explaining the power saving techniques. In other words, the smartphone is only one example of a wide array of electronic devices that may incorporate the power saving techniques.

The device 100 may support one or more Subscriber Identity Modules (SIMs), such as the SIM1 102 and the SIM2 104. Electrical and physical interfaces 106 and 108 connect SIM1 102 and SIM2 104 to the rest of the device hardware, for example, through the system bus 110. The system bus 110 may include address, data, and control signals.

The device 100 includes a power management unit integrated circuit (PMUIC) 134. In a complex device like a smartphone, the PMUIC 134 may be responsible for generating as many as thirty (30) different power supply rails 136 for the circuitry in the phone. Regardless of complexity or number of supply rails, however, the techniques described below facilitate power saving operation in devices with voltage regulators that have different efficiencies, such as linear regulators (e.g., low dropout (LDO) regulators) and switching regulators (e.g., Buck regulators).

As examples of the circuitry for which the PMUIC 134 may provide power rails, the device 100 includes a communication interface 112, system logic 114, and a user interface 118. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the device 100. In that regard, the system logic 114 may include logic that facilitates, as examples, running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The system logic 114 may include one or more processors 116 and memories 120. The memory 120 stores, for example, control instructions 122 that the processor 116 executes to carry out any of the functionality offered by the device 100. The user interface 118 and other operator inputs 128 may include a graphical user interface, touch sensitive display, voice or facial recognition inputs, buttons, switches, speakers and other user interface elements.

In the communication interface 112, Radio Frequency (RF) transmit (Tx) and receive (Rx) transceivers 130 handle transmission and reception of signals through the antenna(s) 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

As one example, the communication interface 112 and system logic 114 may include a BCM2091 EDGE/HSPA Multi-Mode, Multi-Band Cellular Transceiver controlled by a BCM28150 HSPA+ system-on-a-chip (SoC) baseband smartphone processer or a BCM25331 Athena (TM) baseband processor. The PMUIC 134 may be a BCM59056, BCM59057 or BCM59059 power management unit, as examples. These devices or other similar system solutions may be extended in functionality as described below to provide the power saving functionality described below. These integrated circuits, as well as other hardware and software implementation options for the device 100, are available from Broadcom Corporation of Irvine California.

Figure 2:
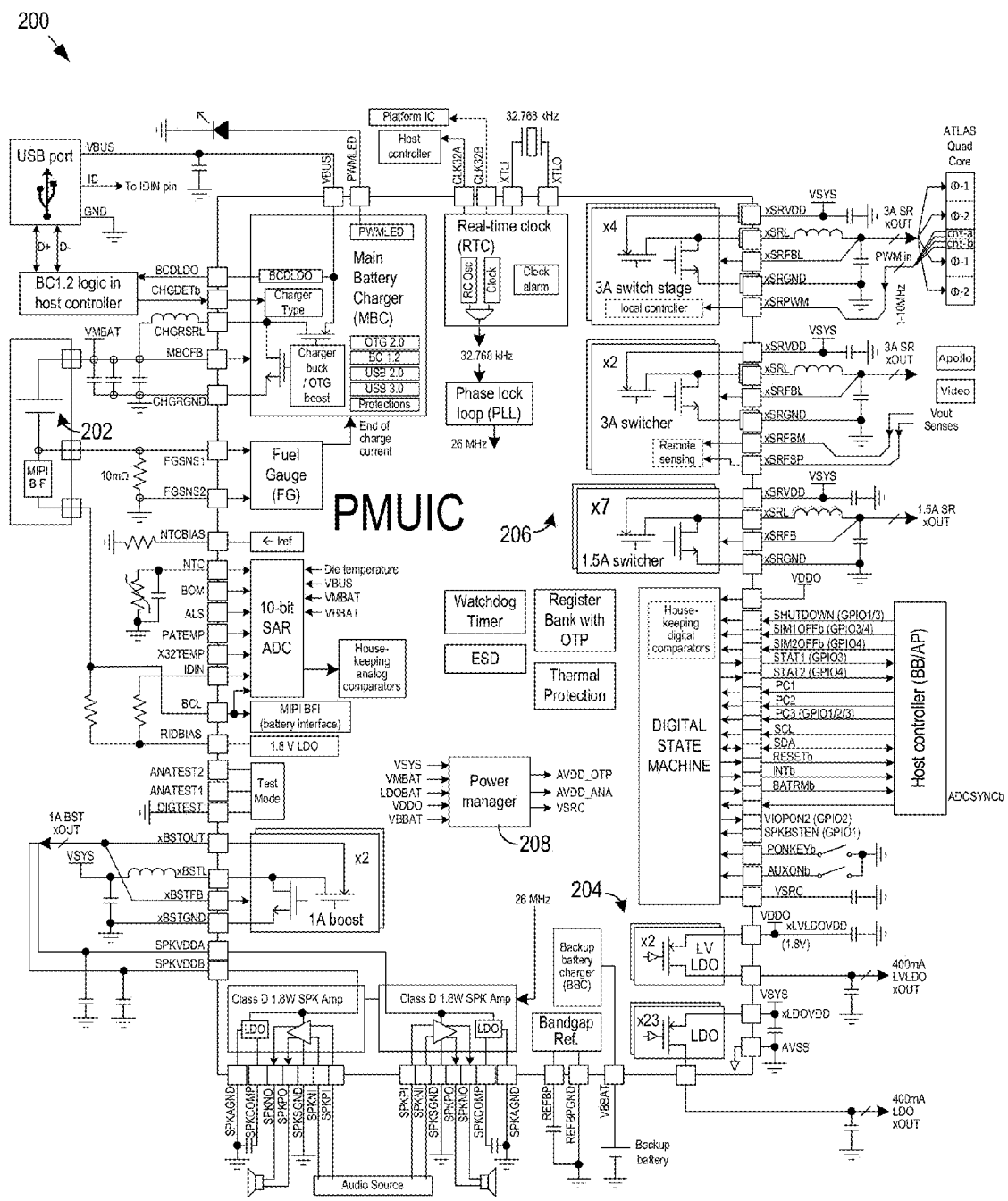
FIG. 2 shows an example PMUIC block diagram for a PMUIC that may be used in an electronic device.

FIG. 2 shows an example PMUIC block diagram 200 for a PMUIC that may be used in the device 100. The battery 202 provides system power, and the PMUIC generates voltage rails for the system using energy from the battery 202. In that respect, the PMUIC may include different types of voltage regulators. Examples include the LDO regulators 204 and the switching regulators 206. Other circuitry is also present in the PMUIC. As a few examples, the PMUIC may include Analog to Digital Converters (ADCs), state machines, watchdog timers, fuel gauges, battery charges, real time clocks, and speaker amplifiers.

In some implementations, a particular voltage regulator, such as an LDO regulator, may provide the power supply to some or all of the circuitry in the PMUIC 134. An LDO regulator, for example, may provide the power supply in particular operating modes, such as a low power mode or sleep mode. The quiescent current supplied by the LDO may be significant, and it is a constant drain on the energy in the battery 202. Because devices may stay in low power modes for extended periods (e.g., a smartphone in sleep mode overnight), the energy drain on the battery can amount to a significant depletion of the energy remaining in the battery. The energy drain is exacerbated by the relatively low efficiency of the LDO regulator.

A power manager 208 in the PMUIC 134 may exercise control over the operation of the PMUIC. For example, the PMUIC 134 may implement registers set by a controller via a communication interface to configure the operational modes of the LDOs 204, switching regulators 206, power manager 208 or other circuitry in the PMUIC. In that regard, for example, a separate controller such as a baseband controller may determine whether and when to set the operational modes, and write the appropriate configuration bits to the PMUIC 134. The registers may control how the voltage regulators in the PMUIC 134 provide power to any circuitry internal or external to the PMUIC 134 in any specific operating mode. As will be explained in more detail below, the configuration bits may control whether, in a particular operating mode such as a low power mode, a switching regulator or an LDO provides the power to specific circuitry.

Figure 3:
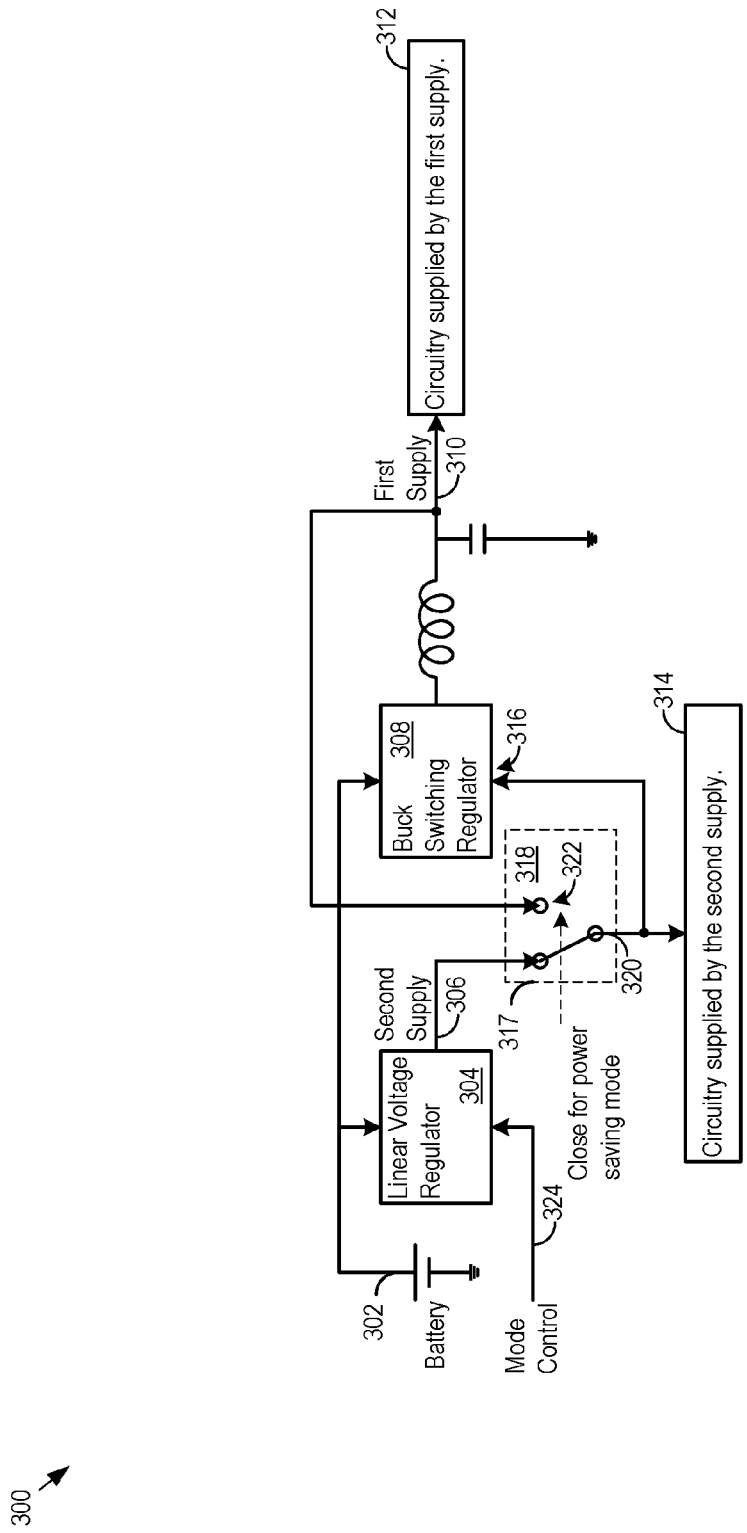
FIG. 3 shows an example circuit for operational startup of a power supply.

FIG. 3 shows an example circuit 300 for operational startup of a power supply. In FIG. 3, the battery 302 provides an energy source for a switching regulator 308 that generates the first supply 310 (e.g., 1.8 V), and for the linear regulator 304 that generates the second supply 306 (e.g., also 1.8 V). The first supply 310 provides power for a first set of circuitry 312, which may include circuitry external to the PMUIC 134, while the second supply 306 provides power for a second set of circuitry 314, which may include circuitry internal to the PMUIC 134 as well as the switching regulator 308. There is, however, no limitation on the location or type of circuitry to which the linear regulator 304 and the switching regulator 308 provide power.

A control circuit 317 is present and provides a selection circuit that may determine which of multiple power supplies provides power to circuitry such as the second set of circuitry 314 and the switching regulator 308. In one implementation, the control circuit 317 is a switch 318, e.g., a Field Effect Transistor (FET) switch, analog multiplexer, or the like. The switch 318 includes switch inputs 322 connected to the first supply 310 and the second supply 306. The switch 318 selectively passes either the first supply 310 or the second supply 306 to the switch output 320. In turn, the switch output 320 coveys the selected power supply to the second set of circuitry 314 and the switching regulator 308, or any other circuitry connected to the switch output 320.

When the battery voltage comes up, the linear regulator 304 starts up, and provides the second supply 306 to the second set of circuitry 314, e.g., to the circuitry internal to the PMUIC 134. Note that the second supply 306 may also provide power to control circuitry in the switching regulator 308 on the operational supply input 316. The control circuitry may include, as examples, a reference generator and a Pulse Width Modulation (PWM) comparator. Thus, to startup the switching regulator 308, the control circuit 317 may (in effect) select the second supply from the linear regulator 304 as the power output from the control circuit 317.

A mode control input 324 may provide configuration information to, as examples, the linear regulator 304, to the power manager 208 which configures the linear regulator 304, or to another controller for the linear regulator 304. An external controller such as a baseband controller may drive the mode control input 324 to set specific bits, for example, that set an operational mode for the linear regulator 304. When the mode control input 324 sets a power saving mode, the switch 318 may change state as will be described in more detail below with regard to FIGS. 4 and 5. In other operational modes, e.g., a full power mode, the switch need not change states, and the linear regulator 304 may continue to provide the power supply to the second set of circuitry 314. The full power mode may operate when the device is connected to specific types of energy sources that are not as limited as the battery, such as a wall outlet or a USB connection to a personal computer. However, the operational modes may be changed at any time regardless of the particular power supply in use.

Figure 4:
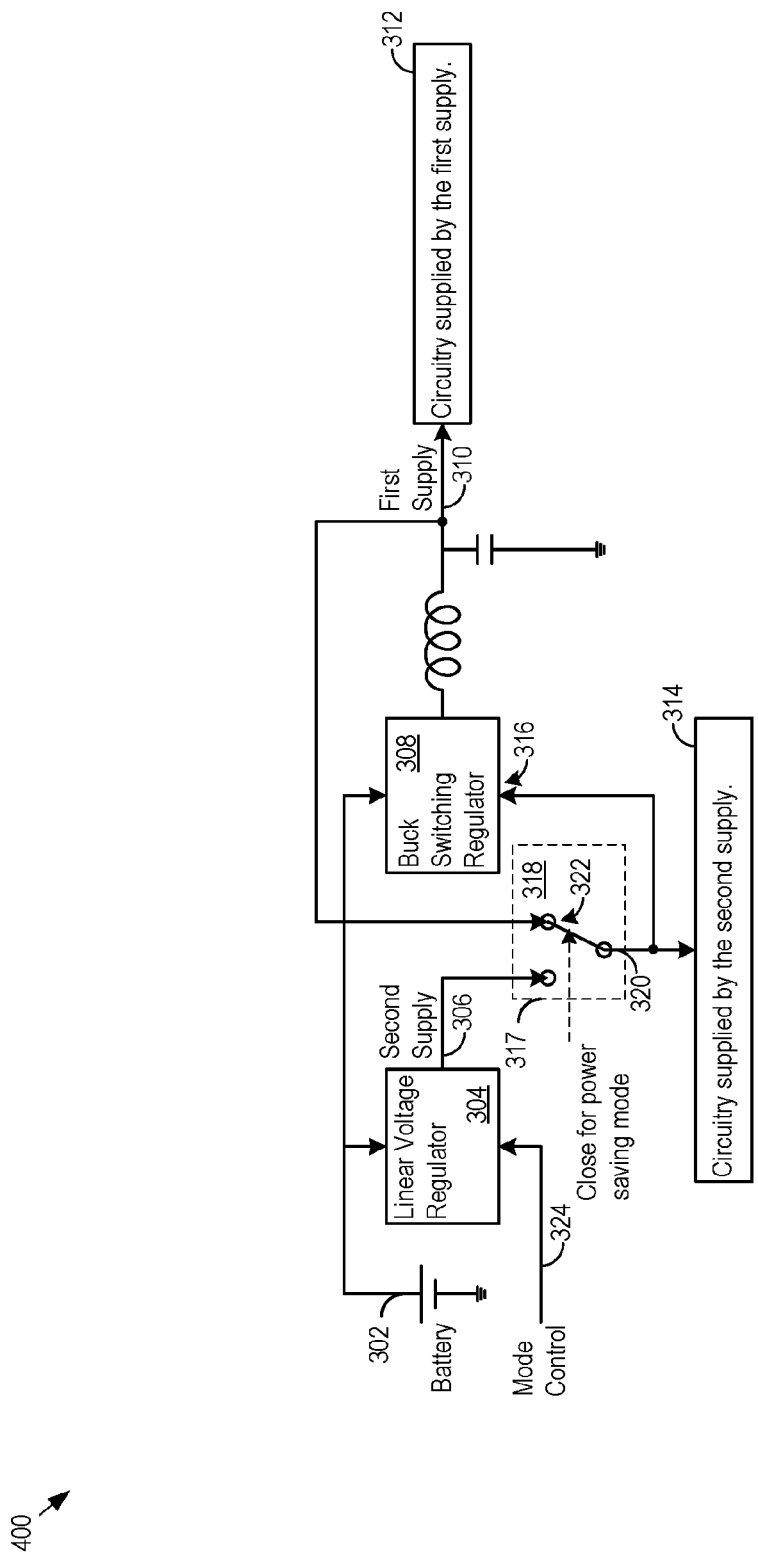
FIG. 4 shows an example circuit for a power saving mode of operation.

FIG. 4 shows an example circuit 400 for a power saving mode of operation. The switch 318 state has changed to select the first supply 310 from the switching regulator 308 as the supply to the second set of circuitry 314. Note also that in this switch state, the switching regulator 308 also provides power to its own internal circuitry on the operational supply input 316.

The switching regulator 308 may have a higher efficiency than the linear regulator 304. As a result, when the switching regulator 308 provides the low power mode quiescent current to the circuitry connected to the power output 320 (e.g., the second set of circuitry 314), power savings are achieved. For example, assuming 200 µA of quiescent current, a switching regulator efficiency of 85%, a battery voltage of 3.8V, and an output voltage of 1.8V, the following analysis shows the efficiency gain.

Efficiency is expressed as the ratio of output power to input power:

$$\eta := \frac{P_{out}}{P_{in}}$$

The input and output powers may be expressed as the product of the relevant voltages and current. With $V_{in}$ representing the battery voltage, $I_{in}$ representing current drawn from the battery, and $I_{out}$ representing the extra current supplied by the switching regulator 308 at the supply voltage of $V_{out}$ when the switching regulator 308 is used instead of the linear regulator 304:

$$\eta := \frac{V_{out} I_{out}}{V_{in} I_{in}}$$

Converting to current drawn from the battery 302:

$$I_{in} := \frac{1}{\eta} \frac{V_{out}}{V_{in}} I_{out}$$

As one specific numerical example, the current drawn from the battery 302 is:
$V_{out}$:=1.8V
$V_{in}$:=3.8V
$I_{out}$:=0.0002 A
$\eta$=0.85
$I_{in}$=0.0001176 A That is, the 200 µA of current is reduced 41% to about 117.6 µA of current to have the switching regulator 308 provide power to the second set of circuitry 314 and to the switching regulator 308.

The power saving is due in part to the fact that the switching regulator 308 is characterized by a current transformer ratio based on the duty cycle and the efficiency of the switching regulator 308. The circuit takes advantage of the output of the switching regulator 308, which operates at the desired voltage of the second set of circuitry 314. The result is effectively a reduction, by the transformer ratio, of the current drawn from the battery to a lower current. Accordingly, when the switching regulator 308 is up and running, the switching regulator 308 may take over for the linear regulator 304. This may happen at any time the switching regulator output is high enough, stable enough, or otherwise suitable for providing power to the circuitry that the linear regulator 304 would otherwise power. Changing over to the switching regulator 308 may happen whether or not the device is in a power saving mode, or in some implementations may be executed only when the device is in a power saving mode.

Figure 5:
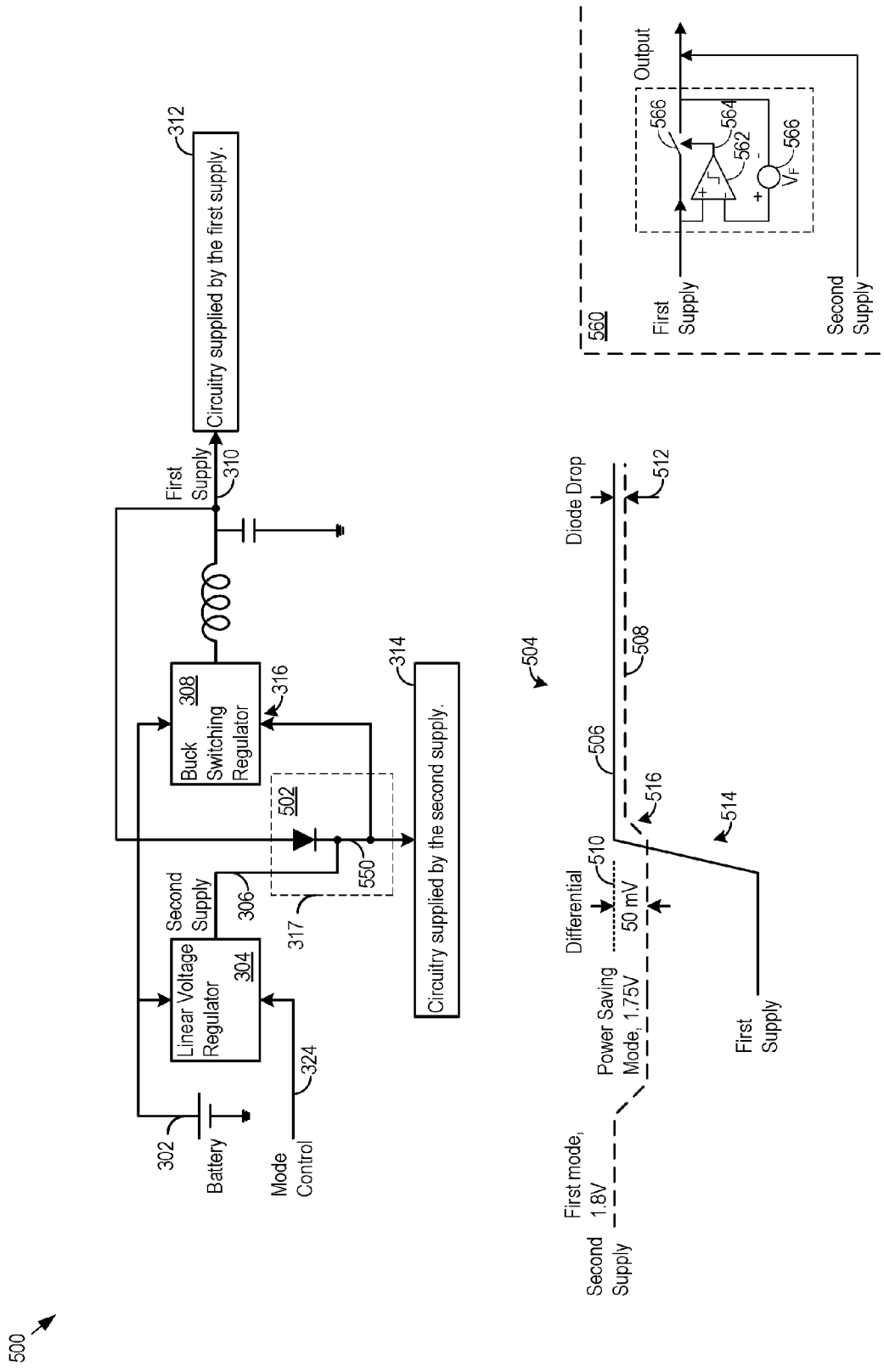
FIG. 5 shows an example circuit that provides power savings.

FIG. 5 shows an example circuit 500 that provides power savings. In the circuit 500, the control circuit 317 is implemented as a diode 502. The first supply 310 is connected to the anode, and the power output 550 for circuitry such as the second set of circuitry 314 is taken at the cathode. In one implementation, the mode control input 324 sets the linear regulator 304 into a power saving mode. The power saving mode may cause the linear regulator 304 to drop the output voltage of the second supply 306 to allow the diode 502 to conduct the current supplied by the first supply 310, when the switching regulator 308 reaches its operational output voltage.

The voltage waveforms 504 help illustrate the operation of the circuit 500. The voltage waveforms 504 include the first supply voltage 506 and the second supply voltage 508. The power saving mode output voltage differential 510 ("differential 510") is also illustrated, and may be, as just one example, on the order of 50 mV. In general, the differential 510 is set to at least the forward voltage drop 512 on the diode 502, so that when the first supply voltage 506 reaches its nominal voltage output, the diode 502 conducts and the switching regulator 308 provides power to the second set of circuitry 314, including its own internal circuitry.

For example, when in power saving mode, the linear regulator configuration may cause the linear regulator to provide an output voltage of 1.75 V for the second supply 306, instead of 1.8 V when not in power saving mode. In other words, the configuration sets a differential of 50 mV. The differential may be set so that the reduced output voltage remains within the operational tolerances of any or all of the second set of circuitry 314. Then, when the first supply voltage 506 rises above the reduced output voltage by at least the diode drop 512, the diode 502 conducts, the switching regulator 308 provides power through the diode, and the power output 550 at the cathode (and therefore the second set of circuitry 314) rises to the output voltage of the switching regulator 308, minus the diode drop 512.

The voltage waveforms 504 show that the first supply voltage is not up initially, but as the switching regulator 308 comes up, the first supply voltage rises through a transition period 514. The linear regulator 304 provides power to the internal circuitry of the switching regulator 308 to allow it to start its operation. After the first supply voltage 506 rises enough to forward bias the diode 502, the diode 502 switches on to provide the first supply voltage 506 (minus the diode drop 512) to the circuitry initially powered by the linear regulator 304. The switch is illustrated in an exaggerated manner in FIG. 5 at the switching period 516.

Note that the linear regulator 304 may continue operation after the switching regulator 308 switches in. Accordingly, if the first voltage supply 506 falls below the configured output level of the linear regulator 304, the linear regulator 304 again begins to provide the power for the second set of circuitry 314. In other implementations, a controller may shut down the linear regulator 304 once the switching regulator 308 takes over, and may start up the linear regulator 304 prior to shutting down the switching regulator 308. Further, the controller may exercise further timing control by setting the power saving mode in the linear regulator 304 after it determines that the first supply 310 is fully up and running, e.g., the first supply 310 meets any specified output criteria. Alternatively, the controller may set the power saving mode at startup, or at any other time without dependence on the output of the switching regulator 308, thereby allowing the linear regulator 304 to provide the power output until the switching regulator 308 takes over through automatic operation of the diode 502.

The example in FIG. 5 shows a junction diode 502 as the control circuit 317. However, as noted above, the control circuit 317 may be implemented in many different ways. FIG. 5 also shows an alternative control circuit 560. The control circuit 560 emulates a diode using a comparator 562 that has a control output 564 that opens and closes a switch 566 (e.g., a FET switch). The comparator 562 changes the switch state to closed when the voltage on the positive comparator input exceeds the voltage on the negative comparator input, taking into consideration the offset by the voltage reference $V_F$ 566 (e.g., a forward diode drop). With respect specifically to the example above, with the second supply at 1.75 V, the comparator 562 will close the switch 566 to allow the first supply to take over, when the first supply exceeds 1.75 V+$V_F$. Other control circuit implementations are possible.

Figure 6:
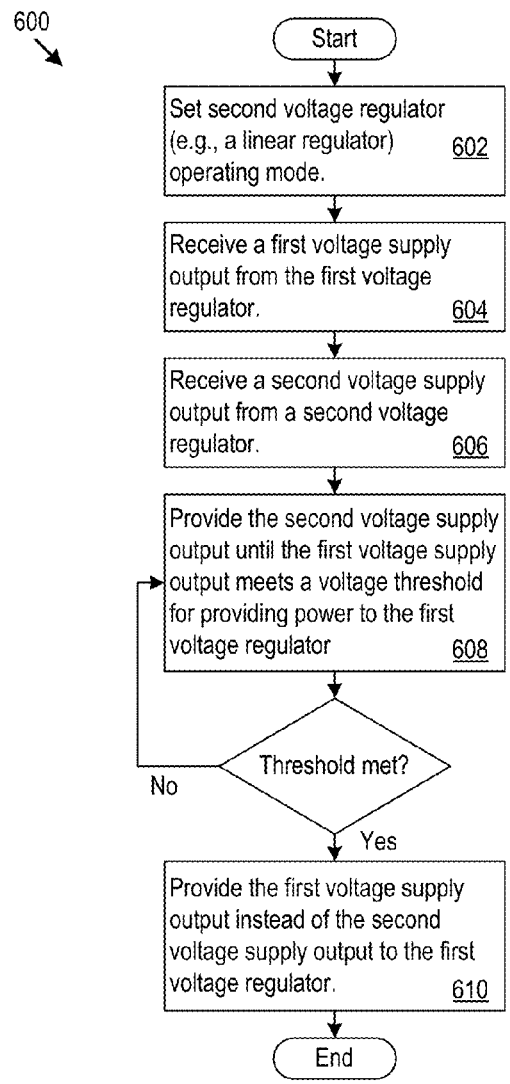
FIG. 6 shows logic for implementing a power saving mode of operation.

FIG. 6 shows logic 600 for implementing a power saving mode of operation. The logic 600 includes setting a second voltage regulator operating mode (602). For example, a baseband controller may place the linear regulator 304 in power saving mode by writing configuration control bits over the mode control input 324. The control bits may specify the voltage output on the second supply 306, e.g., 1.8 V nominally or 1.75 V in power saving mode. The logic 600 also includes receiving (e.g., at a control circuit 317) a first voltage supply output from the first voltage regulator (604) and receiving a second voltage supply output from a second voltage regulator (606). The first voltage regulator may be a voltage regulator that is more efficient than the second voltage regulator, such as a switching regulator. The control circuit 317 may be a switch, a diode (e.g., that receives the first voltage output at the anode, and the second voltage output at the cathode), FETs, or any other configuration of circuit elements that selectively provides an output from among multiple inputs.

The logic 600 may provide the second voltage supply output to the power output (e.g., the anode of the diode 502) until the first voltage supply output meets a voltage threshold for providing power to, e.g., the second set of circuitry 314, including the first voltage regulator. The voltage threshold may be, for example, the configured voltage output of the second voltage regulator, plus a diode drop. The logic 600, after the first voltage supply output meets the voltage threshold, provides the first voltage supply output instead of the second voltage supply output to the power output (610).

Expressed in other words, a circuit includes a switching regulator that produces a first voltage supply output and that includes an operational supply input. The operational supply input may provide power for running the logic in the switching regulator. The circuit also includes a linear regulator that produces a second voltage supply output. A control circuit accepts the first voltage supply output and the second voltage supply output and includes a power output connected to the operational supply input. The control circuit is configured to pass the second voltage supply output to the power output until the first voltage supply output is established, e.g., high enough, stable enough, or both to provide power to the logic in the switching regulator. After the first voltage supply is established, the control circuit instead passes the first voltage supply output to the power output through the control circuit. The first voltage supply output may also then provide power to the circuitry that would otherwise have been powered by the linear regulator. Various implementations have been specifically described. However, other implementations are also possible. For example, the control circuit 317 may be implemented in many different ways to select a power supply from among multiple different available power supplies.

What is claimed is:

1. A circuit comprising:
    a switching regulator comprising:
        a first voltage supply output and
        an operational supply input;
    a linear regulator comprising:
        a mode control input operable to set a power saving mode for the linear regulator; and
        a second voltage supply output,
            the linear regulator configured to facilitate, in conjunction with control circuitry, passage of the first voltage supply output to the operational supply input by regulating the second voltage supply output when the power saving mode is set; and
    the control circuitry comprising:
        connections for the first voltage supply output and the second voltage supply output; and
        a power output in electrical contact with the operational supply input,
            the control circuitry configured to:
                provide the second voltage supply output to the power output until the first voltage supply output is established; and
                after the first voltage supply is established, instead provide the first voltage supply output to the operational supply input through the power output.

2. The circuit of claim 1, where:
    the control circuitry is configured to provide the first voltage supply output to the operational supply input when the power saving mode is set.

3. The circuit of claim 1, where:
    the control circuitry is configured to pass the second voltage supply output until the first voltage supply output exceeds the second voltage supply output.

4. The circuit of claim 1, further comprising:
    a system power supply input to the linear regulator.

5. The circuit of claim 1, further comprising:
    a system power supply input to the switching regulator.

6. The circuit of claim 1, where:
    the switching regulator comprises a DC-to-DC regulator.

7. The circuit of claim 1, where:
    the linear regulator comprises a low dropout (LDO) regulator.

8. A circuit comprising:
    a switching voltage regulator comprising:
        a switching voltage supply output and
        an operational supply input;
    a linear voltage regulator comprising a linear voltage supply output;
    a mode control input operable to:
        select between a switching power mode of operation and a linear power mode of operation; and
        cause the linear voltage regulator to facilitate, in conjunction with a selection circuit, passage of the switching voltage supply output instead of the linear voltage supply output to the operational supply input by regulating the linear voltage supply output when the switching power mode of operation is selected; and
    the selection circuit comprising:
        a connection to the switching voltage supply output and to the linear voltage supply output; and
        a power control output electrically coupled to the operational supply input,
            the selection circuit configured to:
                provide the linear voltage supply output to the power control output when the linear power mode of operation is selected; and
                provide the switching voltage supply output instead of the linear voltage supply output to the operational supply input through the power control output when the switching power mode of operation is selected.

9. The circuit of claim 8, where:
    the selection circuit comprises a diode configured to pass the switching voltage supply output to the operational supply input through the power control output in the switching power mode of operation.

10. The circuit of claim 8, where the selection circuit is further configured to:
    provide the switching voltage supply output instead of the linear voltage supply output, in the switching power mode of operation, after the switching voltage supply output meets a voltage threshold for providing power to the switching voltage regulator.

11. A method comprising:
    at control circuitry comprising a power output electrically coupled to an operational supply input of a switching voltage regulator:
        receiving a switching voltage supply output from the switching voltage regulator;
        receiving a linear voltage supply output from a linear voltage regulator;
        providing the linear voltage supply output to the power output until the switching voltage supply output meets a voltage threshold for providing power to the switching voltage regulator;
        setting a power saving mode using a mode control input of the linear regulator; and after the switching voltage supply output meets the voltage threshold and responsive to setting the power saving mode, facilitating using the linear regulator in conjunction with the control circuitry, passage of the switching voltage supply output instead of the linear voltage supply output to the power output by regulating the linear voltage supply output.

12. The method of claim 11, where passing the switching voltage supply output instead of the linear voltage supply output further comprises:
    passing the switching voltage supply output instead of the linear voltage supply output when the power saving mode is set and after the switching voltage supply output meets the voltage threshold.

13. The method of claim 11, where:
    receiving the linear voltage supply output from the linear voltage supply comprises receiving a linear voltage supply output that is below the voltage threshold by a differential voltage; and
    providing the switching voltage supply output comprises providing the switching voltage supply output responsive to the differential voltage.

14. The method of claim 11, further comprising enforcing the threshold via a forward voltage drop of a diode.

15. The method of claim 11, further comprising setting a full power mode at the mode control input.

16. The method of claim 15, further comprising facilitating, with the linear regulator, passage of the linear voltage supply output instead of the switching voltage supply output to the power output after the switching voltage supply output meets the voltage threshold and responsive to setting the full power mode.

17. The circuit of claim 1, where the mode control input is further operable to set a full power mode.

18. The circuit of claim 17, where the linear regulator is configured to facilitate passage of the second voltage supply output to the operational supply input, when the full power mode is set.

19. The circuit of claim 8, where:
   the circuit is configured to manage power for a mobile device; and
   the mode control input is configured to select between the switching power mode of operation and the linear power mode of operation responsive to a power source of the mobile device.

20. The circuit of claim 8, where the selection circuit further comprises a comparator configured to compare a voltage level of the switching voltage supply output with a voltage level of the linear voltage supply output.

* * * * *